July 3, 1956  J. D. CHRISTIAN  2,753,159
HEAT TRANSFER DEVICE
Filed Dec. 24, 1952  2 Sheets-Sheet 1
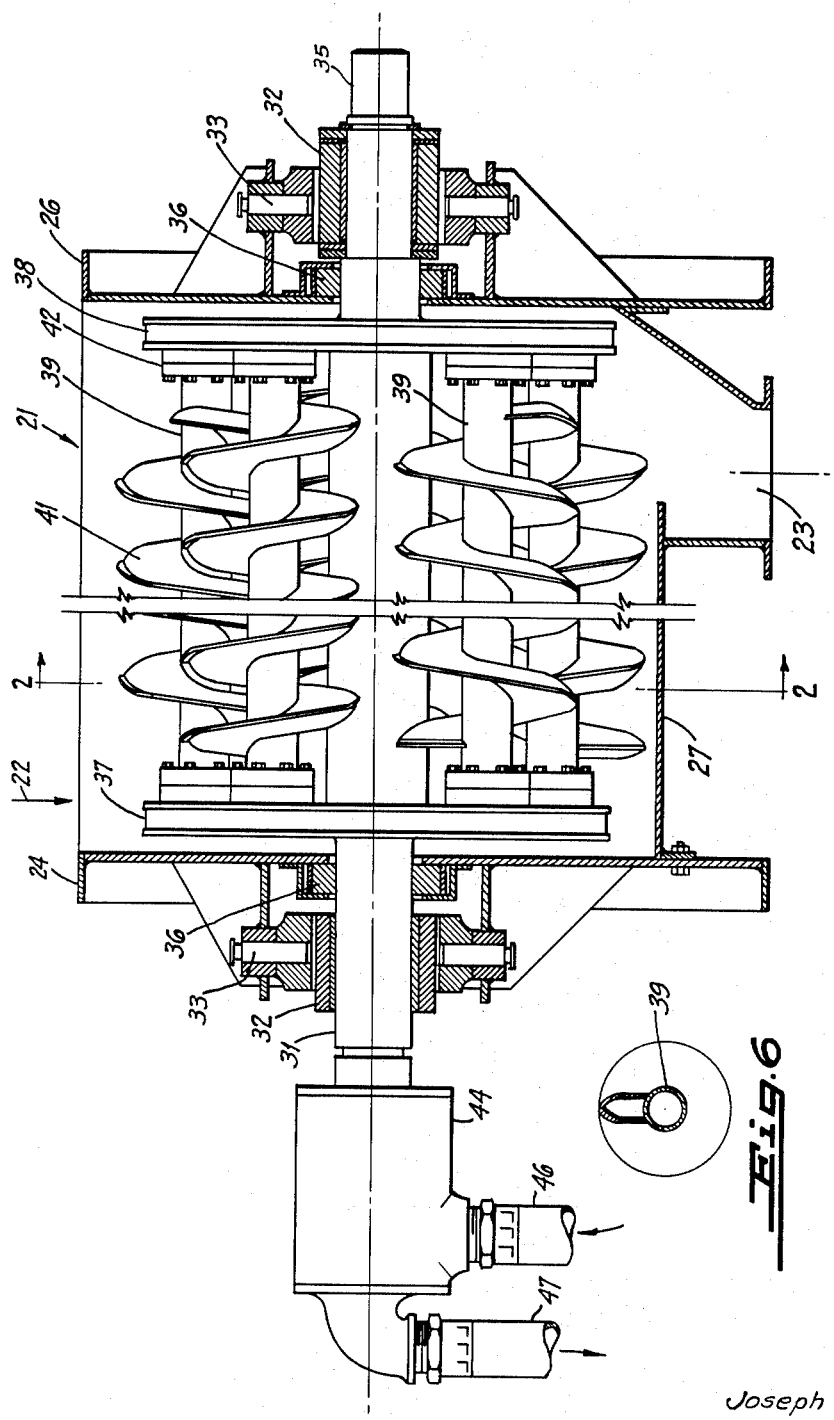
INVENTOR.
Joseph D. Christian
BY  ECKHOFF & SLICK
ATTORNEYS
A MEMBER OF THE FIRM July 3, 1956 — J. D. CHRISTIAN — 2,753,159
HEAT TRANSFER DEVICE
Filed Dec. 24, 1952 — 2 Sheets-Sheet 2
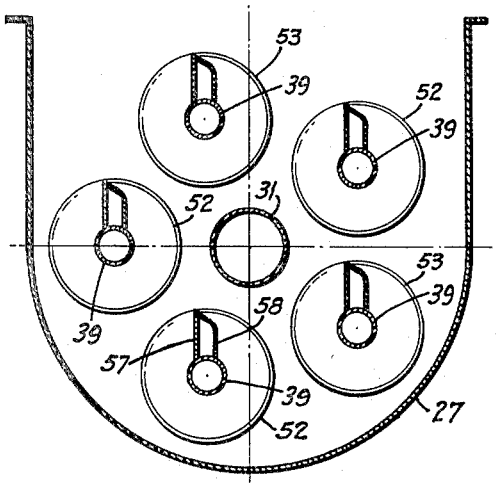
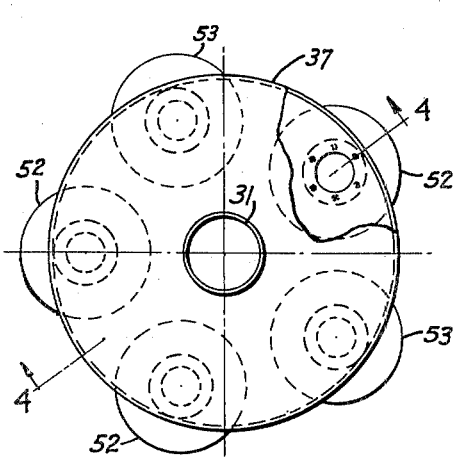
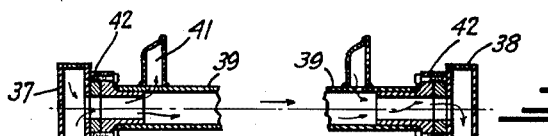
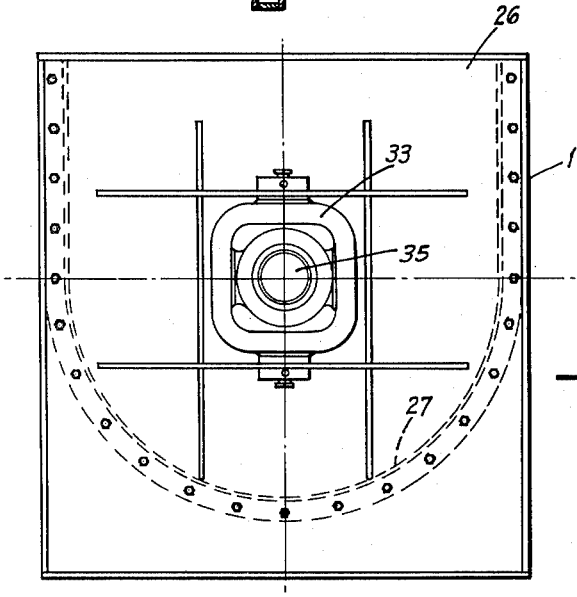
INVENTOR.
Joseph D. Christian
ECKHOFF & SLICK
ATTORNEYS
A MEMBER OF THE FIRM

United States Patent Office 2,753,159
Patented July 3, 1956

2,753,159

HEAT TRANSFER DEVICE

Joseph D. Christian, San Francisco, Calif., assignor to Holo-Flite International Incorporated, San Francisco, Calif., a corporation of California Application December 24, 1952, Serial No. 327,780

1 Claim. (Cl. 257—79)

This invention relates to a device for processing a material or materials; it can be used for the heating or cooling of any fluid and, in addition, for the mixing of two or more fluid materials. The term "fluid material" as herein used means any non-gaseous material which can be made to pass through a screw conveyor. Thus materials such as sand, salt, sugar, gravel and baby food as well as liquids are considered fluids for the purposes of this application.

It is in general the broad object of the present invention to provide an improved device for the heating or cooling of a fluid.

A further object of the present invention is to provide a processing device wherein a fluid material is subjected to agitation during passage of a fluid through the device.

The invention includes other objects and features of advantage, some of which, together with the foregoing, will appear hereinafter. In the drawings accompanying and forming a part hereof:

Figure 1 is a side elevation partly in section through a form of processing device embodying the present invention.

Figure 2 is a section taken along the line 2—2 in Figure 1.

Figure 3 is an end view of a cluster of screw conveyor flights.

Figure 4 is a section taken along the line 4—4 in Figure 3.

Figure 5 is an end view of the device shown in Figure 1.

Figures 6 and 7 are section views similar to Figure 2, but showing a section of only a single flight.

Referring to the drawings, the device includes a trough-like structure 21 having a material inlet as at 22, and, at the opposite end of the trough, a material outlet in the form of a discharge spout 23. The trough includes end walls 24 and 26 connected by an arcuately shaped trough 27 extending horizontally between the end walls 24 and 26, the discharge spout 23 being at one end of the arcuate trough.

Mounted for rotation upon the end walls and extending horizontally between them is a shaft 31 mounted in self-aligning bearings 32, these in turn being mounted in gimbals 33. Shaft seals 36 are provided at each end wall to prevent material from seeping out around the shaft. The shaft 31 is generally hollow throughout its length, but includes a solid end 35 which is connected to a suitable prime mover. Mounted at each end of shaft 31 within the trough 21 are drums 37 and 38. Each of the drums is hollow and is connected to the shaft 31 as will be described. Extending between the drums 37 and 38 are a plurality of standards 39, each of which carries a screw conveyor flight, generally indicated at 41. In the form shown particularly in Figures 1 through 4, the several standards 39 are secured to the end of the drum as at 42. Each of the screw conveyor flights 41 is hollow, as is indicated in Figures 2 and 4, and fluid is circulated therethrough to provide for a desired heat exchange of material passing through the device. To effect this, a rotary union 44 is mounted upon an end of the hollow shaft 31, the union having a fluid inlet 46 and a fluid outlet 47. Fluid introduced through the inlet 46 passes into the hollow shaft 31 and thence into drum 37, through which it is distributed into each of the hollow standards 39 and into each flight 41, as has been indicated by the arrows in Figure 4. The fluid passes through the hollow flight and through the standard and thence into the drum 38 and back to the hollow shaft 31. An annulus 51 is provided in the hollow shaft 31 adjacent the inlet end thereof and an outlet pipe 62 is joined to the annulus 51 to remove the spent heat exchange fluid to the outlet 47.

As has been indicated in Figure 2, the hand of the screw conveyor flights can be varied. Thus, referring particularly to Figure 2, the flights indicated by numeral 52 are each right hand, while those indicated at 53 are left-hand. In use, with the screw conveyor flight cluster rotated in a clock-wise direction, as in Figure 2, the material fed into the trough and a suitable exchange material passed through the hollow shaft 31 and the several flights and standards, the material is subject to tremendous particle agitation when the cluster is rotated. The several heat exchange surfaces on the screw conveyor flights plough through the material in the trough and lift it, the material cascading back through the cluster of heat exchange screws. In this manner, all portions of the material being treated is brought into repeated contacts with the heat exchange surfaces.

Various modifications are possible in the device. For example, the screws can be interleaved, that is, the surfaces of one can lie within and between the surfaces of the adjacent flights. While it is preferred not to rotate the several flights on their own axes, i. e. planet-wise, because this permits lighter standards to be employed to support the flights, enables the flights to be constructed more inexpensively inasmuch as they need not be straightened and decreases complexity by permitting fewer glands and simpler drive mechanism, it is possible to rotate the several flights. In addition, it is possible to vary the retention time within the trough by altering the proportion of right-hand to left-hand screws. In Figure 2, three right-hand screws have been shown, in conjunction with two left-hand screws. If four right-hand screws were used and only one left-hand screw, or if all the screws were right-hand, the retention time of the material would be less.

Similarly, the number of screws may be varied, as long as at least two are used. Although the illustration shows five screws, 2, 3, 4, 5 or an even higher number can be used. It is obvious that in order to move material through the conveyor there cannot be an exact balance between left-hand and right-hand flights. Thus, if two flights are used both flights must be of the same hand. If an odd number of flights are used, the flights can all be of the same hand, or any combination of right-hand and left-hand flights can be used. In other words, flights of one hand must predominate.

The cross-sectional shape of the individual screw conveyor flights can be varied. For example, in Figure 2 I have shown each flight as a helix having a single flat face 57 substantially at 90° to the longitudinal axis of the supporting standard, this flat face being joined by an arcuately formed face 58 extending from substantially the outer periphery of the flat face 57 to the standard. Both faces can be arcuately formed, as is shown in Figure 6, or one can utilize two parallel flat faces joined together along their terminal edges as is shown in Figure 7. Further, various combinations of such flights can be used, so that one may have a curved face adjacent a curved face, a straight face adjacent a straight face, or a curved face adjacent a straight face. The manner in which various types of flights may be combined is set forth in more detail in my copending application Serial No. 532,985, filed September 7, 1955, now Patent No. 2,731,241.

I claim:

A heat exchange device of the class described, comprising a trough-like casing having a top, a bottom, a material inlet adjacent one end thereof and a material outlet adjacent the other end thereof, a hollow shaft mounted for rotation within said casing, a pair of headers each mounted on the hollow shaft at an end thereof and having a fluid connection with the shaft, a plurality of hollow screw conveyor flights fixedly mounted between said headers with the longitudinal axis of each screw conveyor flight substantially parallel to said shaft, said flights being selected from right-hand flights and left-hand flights, the number of flights of one hand predominating over the number of flights of the other hand, said flights being rotatable with said shaft over the bottom of the casing and below the top of the casing, and conduit means for circulating a heat exchange fluid through said shaft, each header and through the hollow screw conveyor flights.

References Cited in the file of this patent

UNITED STATES PATENTS

| | | |
|---|---|---|
| 78,639 | Badoux | June 9, 1868 |
| 94,574 | Cutler | Sept. 7, 1869 |
| 778,558 | Truxal | Dec. 27, 1904 |
| 1,356,296 | La Cassa | Oct. 19, 1920 |
| 1,987,952 | Wilson | Jan. 15, 1935 |
| 2,321,185 | Christian | June 8, 1943 |
| 2,610,033 | Rietz | Sept. 9, 1952 |

FOREIGN PATENTS

| | | |
|---|---|---|
| 68,795 | Netherlands | Sept. 16, 1951 |
| 534,988 | Germany | Oct. 5, 1931 |
| 561,760 | Great Britain | June 2, 1944 |